(No Model.)

F. DOUGLAS.
SADDLE FOR BICYCLES.

No. 467,342. Patented Jan. 19, 1892.

Witnesses
W. Rossiter
F. H. Mills.

Inventor
Frank Douglas
By Banning & Banning
and Payson Attys.

THE NORRIS PETERS CO., PHOTO-LITHO., WASHINGTON, D. C.

UNITED STATES PATENT OFFICE.

FRANK DOUGLAS, OF CHICAGO, ILLINOIS.

SADDLE FOR BICYCLES.

SPECIFICATION forming part of Letters Patent No. 467,342, dated January 19, 1892.

Application filed August 31, 1891. Serial No. 404,234. (No model.)

*To all whom it may concern:*

Be it known that I, FRANK DOUGLAS, a citizen of the United States, residing at Chicago, State of Illinois, have invented a new and useful Improvement in Saddles for Bicycles, Tricycles, and Velocipedes, of which the following is a specification.

My invention relates to a class of saddles known as the "suspension-saddle." In the forward end of a leather seat is riveted a metallic front clip or hook for the purpose of attaching the front double-coil spring, while the rear of the leather seat is attached to bolts passing through a sheet-metal cantle formed to fit inside of the curved leather seat. The lower end of the rear double spring, which is preferably composed of one wire, is bent into U-shaped form to fit the sheet-metal spring-plate for its under side and to correspond in shape and width to the sheet-metal curved and U-shaped stretcher-plate to which the metal spring-plate is fastened. A bolt passing through the spring-plate and between the sides of the spring also passes through an oblong hole in the stretcher-plate, and by a nut and washer the spring is held firmly between the under side of the stretcher-plate and the spring-plate, while the forward spring, which is composed, preferably, of one wire and bent to fit the metallic saddle-clip, extends back into the spring-plate, with its ends bent at right angles to the parallel portion of the spring to form a seat in the forward spring-plate to hold the spring in a perpendicular position, and is secured by means of a bolt passing through an oblong opening through the stretcher with a nut and washer, the same as the rear spring. The seat-post stud, which has a hole T to correspond with the size of the seat-post at right angles to its set-screw for holding it on the seat-post, has a surface corresponding in shape and width to the shape of the under side of the stretcher-plate and has a stem about the center of the stud, which passes up through a slot-hole near the center of the stretcher-plate, over which is fitted a curved washer to correspond to the upper side of the stretcher-plate and a nut to firmly hold the stud to the stretcher-plate.

Figure 1:
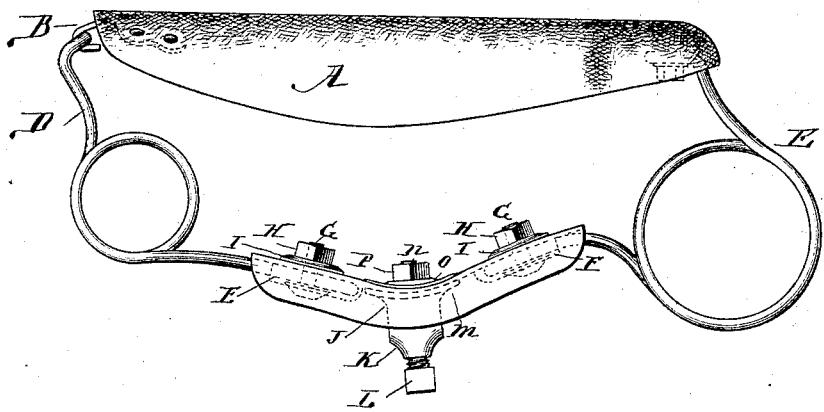
Figure 2:
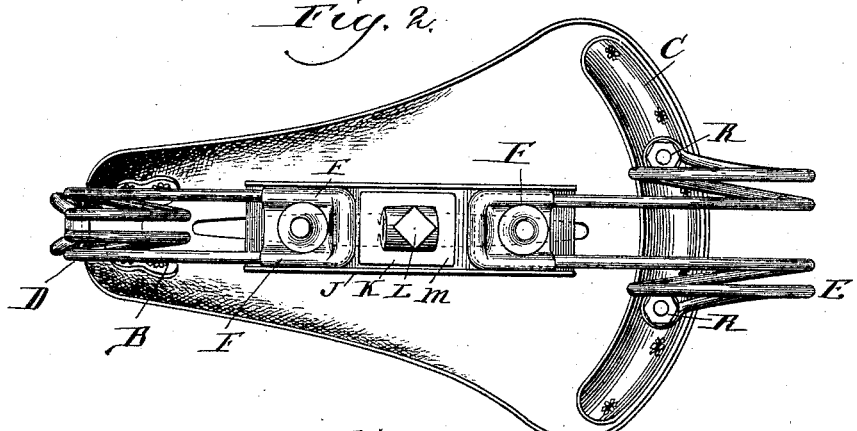
Figure 3:
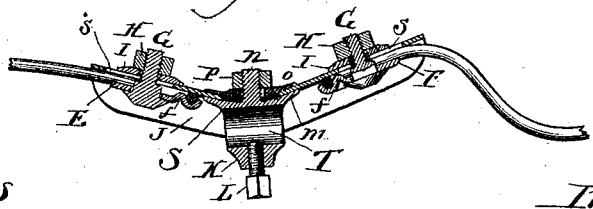
Figure 4:
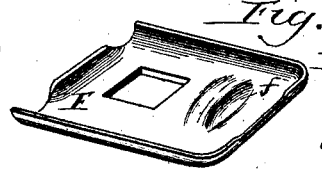

In the accompanying drawings, Figure 1 is an illustration of a side view of the complete saddle. Fig. 2 is a view of the under side of the complete saddle. Fig. 3 is a longitudinal sectional view of the stretcher-plate, clamp-plate, seat-post stud, bolts, and washers cut through the center and showing a small section of the forward and rear springs where they are fastened between the clamp-plate and the stretcher-plate; Fig. 4, a perspective view showing the inner side of the clamp-plate with its square bolt-hole, curved sides, and indented projection to hold the ends of the spring in place.

A is the saddle-leather; B, the metallic front clip; C, the cantle on the rear of the saddle; D, the front spring; E, the rear spring; F F, the clamp-plates; G G, the bolts; H H, the nuts; I I the washers; J, the stretcher-plate; K, the seat-post stud; L, the set-screw to hold the seat-post stud onto the seat-post; M, the curved portion of the seat-post stud, which fits the under side of the stretcher-plate; n, the threaded stem on the upper side of the seat-post stud, which passes through the slotted opening of the stretcher-plate.

O is the curved washer, fitting over the stem n and resting upon the upper curved surface of the stretcher-plate.

P is the nut which screws on the threaded end of the seat-post stud for the purpose of clamping the seat-post stud firmly to the stretcher-plate.

R R are bolts with nuts for holding the rear spring to the cantle C.

Similar letters of reference refer to corresponding parts of each drawing.

The constructions and operations of this saddle may be more fully described as follows:

The stretcher-plate J is composed of one piece of plate-steel or other metal, which is cut out and bent at its sides into U shape, or with its sides bent down at right angles to the cross-section of its top. It is also curved or bowed near the center, where it rests upon the seat-stud K, and is provided with an oblong hole or slot S, through which the screw end of the seat-post stud passes for the purpose of raising and lowering the front of the saddle by moving it in the one direction or the other on the stud. Near each end of the stretcher-plate are oblong holes or slots s s to receive the bolts G, which hold the springs up to the under side of the stretcher-plate. The clamp-plates F F are also made of plate-steel or other metal, which is pressed into shape, as shown in Fig. 4, and which causes it to fit snugly over the lower ends of the said springs D and E, and is provided with a square hole to keep the bolts G G from turning when screwing on the nuts H H, and is also provided with a depression or indentation upon its outer side, near its curved end, to make a ridge or shoulder $f$ for the purpose of holding the cross-sectional ends of the springs firmly between this raised point $f$ of its inner side and the curved end of the clamp-plate.

Clamp-plates F F serve the double purpose of holding the saddle-springs in their upright position firmly to the stretcher-plate by means of the bolts G G and of stretching the leather seat more tightly by loosening the nuts and bolts G G, which pass through the oblong openings or slots $s$ $s$ in the stretcher-plate, and drawing the spring and clamp-plate so loosened nearer to the ends of the stretcher-plate when the nuts H are tightened up again and hold the spring firmly in its new position, as before. When the rider wishes to adjust his saddle forward or back on the seat-post, he loosens the set-screw L to make his adjustment. When he wishes to raise or lower the front of his saddle, he loosens the nut P on the screw-stem $n$, which passes up through the oblong opening or slot S in the stretcher-plate J and tilts the stretcher-plate forward or back on the curved surface of the seat-post stud K, and screws the nut P tightly again when the desired position is obtained.

Having thus described the nature and object of my invention, what I claim as new, and desire to secure by Letters Patent, is—

1. In a bicycle-saddle, a stretcher-plate formed of one piece of sheet metal with its sides bent downward U-shaped to receive the ends of the saddle-springs and curved or bowed near its center to correspond with the curved flange of the seat-post stud, on which it rests, substantially as described.

2. In a bicycle-saddle, a stretcher-plate formed of one piece of sheet metal with its sides bent downward U-shaped to receive the ends of the saddle-springs and curved or bowed near its center to correspond with the curved flange of the seat-post stud, on which it rests, and provided with an oblong opening or slot near its center, in combination with a seat-post stud and the seat-springs against the stretcher-plate, substantially as described.

3. A seat-post stud provided with a hole for the seat-post and a flange projection, from which extends upward a stem to pass through the stretcher-plate, in combination with a stretcher-plate, substantially as described.

4. A clamp-plate pressed up from sheet metal to partially envelop the lower ends of the springs and provided with a raised indentation near the cross-section of the wire springs to hold the springs between this raised portion and the curved end of the clamp-plate, in combination with a stretcher-plate, substantially as described.

FRANK DOUGLAS.

Witnesses:
 EPHRAIM BANNING,
 SAMUEL E. HIBBEN.